United States Patent
Østergaard et al.

(10) Patent No.: US 10,738,762 B2
(45) Date of Patent: Aug. 11, 2020

(54) METHOD AND SYSTEM FOR CONTROLLING A WIND TURBINE TO MANAGE EDGEWISE BLADE VIBRATIONS

(71) Applicant: Vestas Wind Systems A/S, Aarhus N. (DK)

(72) Inventors: Kasper Zinck Østergaard, Flemming (DK); Martin Brødsgaard, Hinnerup (DK); Tobias Gybel Hovgaard, Ry (DK)

(73) Assignee: Vestas Wind Systems A/S, Aarhus N. (DK)

(*) Notice: Subject to any disclaimer, the term of this patent is extended or adjusted under 35 U.S.C. 154(b) by 98 days.

(21) Appl. No.: 16/091,374

(22) PCT Filed: Apr. 7, 2017

(86) PCT No.: PCT/DK2017/050111
§ 371 (c)(1),
(2) Date: Oct. 4, 2018

(87) PCT Pub. No.: WO2017/174094
PCT Pub. Date: Oct. 12, 2017

(65) Prior Publication Data
US 2019/0154001 A1    May 23, 2019

(30) Foreign Application Priority Data
Apr. 8, 2016    (DK) .................... 2016 70211

(51) Int. Cl.
*F03D 7/02* (2006.01)
*F03D 17/00* (2016.01)
*F03D 7/04* (2006.01)

(52) U.S. Cl.
CPC ......... *F03D 7/0296* (2013.01); *F03D 7/0224* (2013.01); *F03D 7/0276* (2013.01);
(Continued)

(58) Field of Classification Search
CPC ........ F03D 17/00; F03D 7/0296; F03D 7/042; F03D 2270/807; F05B 2260/96
See application file for complete search history.

(56) References Cited

U.S. PATENT DOCUMENTS 8,162,788 B2 * 4/2012 Hatch .................... F03D 7/043
                                                        475/62
9,453,760 B2    9/2016 Lysen
(Continued)

FOREIGN PATENT DOCUMENTS

CA    2760994 A1    6/2012
CN    102410139 A    4/2012
(Continued)

OTHER PUBLICATIONS

Laszlo, A. Closed form solution of Eigen frequency of monopile supported offshore wind turbines in deeper waters incorporating stiffness of substructure and SSI. Soil Dynamics and Earthquake Engineering. Feb. 2016. (Year: 2016).*
(Continued)

*Primary Examiner* — Michael Lebentritt
*Assistant Examiner* — Topaz L. Elliott
(74) *Attorney, Agent, or Firm* — Wood Herron & Evans, LLP

(57) ABSTRACT

A method of controlling a wind turbine comprising at least one rotor blade, and at least one accelerometer housed within a nacelle or a tower of the wind turbine. The method comprises: determining a whirling mode frequency for the wind turbine; measuring an acceleration signal that is indicative of the movement of the nacelle of the wind turbine; determining a frequency spectrum of the measured acceleration signal in the proximity of the determined whirling mode frequency; determining a characteristic value that is representative of the energy content of the measured acceleration signal having the determined frequency spectrum;
(Continued)

and performing at least one control action if the characteristic value exceeds a predetermined threshold.

14 Claims, 6 Drawing Sheets

(52) U.S. Cl.
CPC .............. *F03D 7/042* (2013.01); *F03D 17/00* (2016.05); *F05B 2260/70* (2013.01); *F05B 2260/96* (2013.01); *F05B 2270/101* (2013.01); *F05B 2270/807* (2013.01); *Y02E 10/723* (2013.01)

(56) References Cited

U.S. PATENT DOCUMENTS

| | | | |
|---|---|---|---|
| 2011/0049883 A1* | 3/2011 | Hatch | F03D 7/043 290/44 |
| 2012/0068462 A1 | 3/2012 | Laurberg | |
| 2012/0257967 A1 | 10/2012 | Egedal et al. | |
| 2013/0204579 A1* | 8/2013 | Volkmer | F03D 7/042 702/184 |
| 2015/0000404 A1 | 1/2015 | Brenner et al. | |
| 2017/0096986 A1* | 4/2017 | Takeuchi | H04L 1/08 |

FOREIGN PATENT DOCUMENTS

| | | |
|---|---|---|
| CN | 102562491 A | 7/2012 |
| CN | 103711642 A | 4/2014 |
| DK | 173029 B1 | 11/1999 |
| EP | 2431605 A1 | 3/2012 |
| WO | 2008067814 A2 | 6/2008 |
| WO | 2015086024 A1 | 6/2015 |
| WO | WO-2017092773 A1 * | 6/2017 ........... F03D 7/0296 |

OTHER PUBLICATIONS

China National Intellectual Property Administration, First Notification of Office Action in CN Application No. 201780035107.1, dated Sep. 26, 2019.

European Patent Office, International Search Report and Written Opinion in PCT Application No. PCT/DK2017/050111, dated Jul. 6, 2017.

Danish Patent and Trademark Office, Examination Report in PA 2016 70211, dated Nov. 7, 2016.

Thirstrup J. Petersen et al., "Local Blade Whirl and Global Whirl Interaction". Risø-R-1067(EN), Risø National Laboratory, Roskilde, Denmark, Aug. 1998.

* cited by examiner

METHOD AND SYSTEM FOR CONTROLLING A WIND TURBINE TO MANAGE EDGEWISE BLADE VIBRATIONS

TECHNICAL FIELD

Aspects of the invention relate to a method and system for controlling a wind turbine and, more specifically, to identify and manage unacceptable vibrations in blades of the wind turbine.

BACKGROUND

Wind turbines are designed to operate reliably and safely under a wide range of wind conditions. However, despite careful design practices some wind conditions may result in oscillations of the wind turbine components, particularly the blades. Such oscillations can compromise the reliable operation of the wind turbine, and this is particularly the case if the oscillations coincide with resonant frequencies of the wind turbine. Since resonant oscillations can lead to damage of wind turbine components, much effort is made to measure potentially dangerous vibrations of components and to mitigate their effect.

A source of vibration that is not currently particularly well understood, measured, or managed is vibration of wind turbine blades in the edgewise direction. Edgewise vibration at certain frequencies can cause damage to the blades but also to other components of the wind turbine.

Some attempts to quantify edgewise vibration have been made using sensors incorporated into the blades. However, a large number of sensors are necessary that are often expensive and that have to be incorporated into the blade carefully so as not to be in the way of other features such as lightning protection systems. Additionally, for older wind turbines, retrofitting sensors is much more expensive and can compromise the structure of the blade.

It is the aim of the present invention to address at least some of the abovementioned issues.

SUMMARY OF THE INVENTION

According to an aspect of the invention there is provided a method of controlling a wind turbine comprising at least one rotor blade, and at least one accelerometer housed within a nacelle or a tower of the wind turbine. The method comprises: determining a whirling mode frequency for the wind turbine; measuring an acceleration signal that is indicative of the movement of the nacelle of the wind turbine; determining a frequency spectrum of the measured acceleration signal in the proximity of the determined whirling mode frequency; determining a characteristic value that is representative of the energy content of the measured acceleration signal having the determined frequency spectrum; and performing at least one control action if the characteristic value exceeds a predetermined threshold. The method may also comprise determining a further whirling mode frequency and performing the aforementioned steps in relation to that further whirling mode frequency.

The invention also embraces a controller for a wind turbine control system comprising at least one accelerometer housed within a nacelle or a tower of the wind turbine and at least one rotor blade, wherein the controller comprises a processor, a memory module, and an input/output system, and wherein the memory includes a set of program code instructions which when executed by the processor, implements a method as defined above. Aspects of the invention also reside in a wind turbine incorporating such a controller, and a computer program product downloadable from a communication network and/or stored on a machine readable medium, comprising program code instructions for implementing a method as defined above.

Advantageously, the method provides an effective technique for monitoring and managing edgewise vibrations without needing blade-mounted accelerometers. This benefits the safe operation of the wind turbine. The method uses only a single tower- or nacelle-mounted accelerometer, which may readily be implemented in both new and older turbines.

The whirling mode frequency may be determined in dependence on a measured rotor frequency and a predetermined edgewise vibration frequency of the rotor blade. The determined whirling mode frequency or frequencies may be a forward whirling mode and a backward whirling mode, both of which can be hazardous to the safe operation of the wind turbine in certain wind conditions. It is particularly advantageous to be able to determine the forward and backward whirling mode frequency independently, as well as simultaneously, as this provides flexibility of control and allows tailoring of the monitoring according to the wind conditions.

Determining the frequency spectrum may comprise filtering the measured acceleration signal using a band-pass filter having a centre frequency that is equal to one of the determined one or more whirling mode frequencies. By filtering the signal with a band pass filter, some operational vibration and other frequency content is filtered out, leaving a particularly useful vibration spectrum that is substantially composed of vibration in the region of the whirling mode frequency. The process therefore 'picks out' the frequency content in the tower/nacelle acceleration that can be considered attributable to the edgewise vibration of the blades.

The band-pass filter may have a bandwidth of between 0.1 Hz and 0.5 Hz. This bandwidth is particularly suited to remove noise and operational vibration.

The characteristic value may be an instantaneous peak value. Alternatively, the characteristic value may be related to the Root Mean Square (RMS) of the frequency spectrum.

The threshold may be determined as a function of blade pitch angle. Blade pitch angle of a blade alters the vibration characteristics of that blade, and determining the threshold based on blade pitch angle ensures that unacceptable vibrations are identified accurately.

The control action may be performed if the threshold is exceeded for more than a predetermined time limit. A benefit of this is to reduce the likelihood of implementing a control action in response to transient or anomalous vibration or movement of the turbine.

The control action may comprise generating a record, including the characteristic value, the duration of the exceedance of the threshold, the time at which the exceedance occurred. The control action may also comprise storing raw data of the exceedance for later analysis and/or issuing an alert to an external reporting system.

These control actions allow for beneficial continued monitoring of the wind turbine and analysis of exceedance events.

The control action may comprise causing a blade pitch angle of the or each rotor blade to be moved to a predetermined blade pitch angle that is different to a blade pitch angle at which the acceleration measurement was made. By pitching the blades to a predetermined blade pitch angle, it is possible to beneficially reduce vibrations in the wind turbine to safe levels.

The control action may comprise changing a rotational speed of the rotor such that the whirling mode frequencies are altered. The control action may alternatively comprise operating an actuator in order to alter a profile of a blade using a flap attached to the actuator. In a similar manner to pitching the blades, these control actions advantageously act to reduce vibrations to safe levels.

The control action may comprise implementing a shutdown process within the wind turbine or may alternatively involve derating the wind turbine so as to reduce its power output in some way. Derating the wind turbine would reduce the excitation of the blades thereby enabling the blade oscillations to be managed, although a complete shutdown of the wind turbine may be required in certain wind conditions.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

The invention will now be described by way of example with reference to the accompanying drawings, in which.

DESCRIPTION OF EMBODIMENTS

Figure 1:
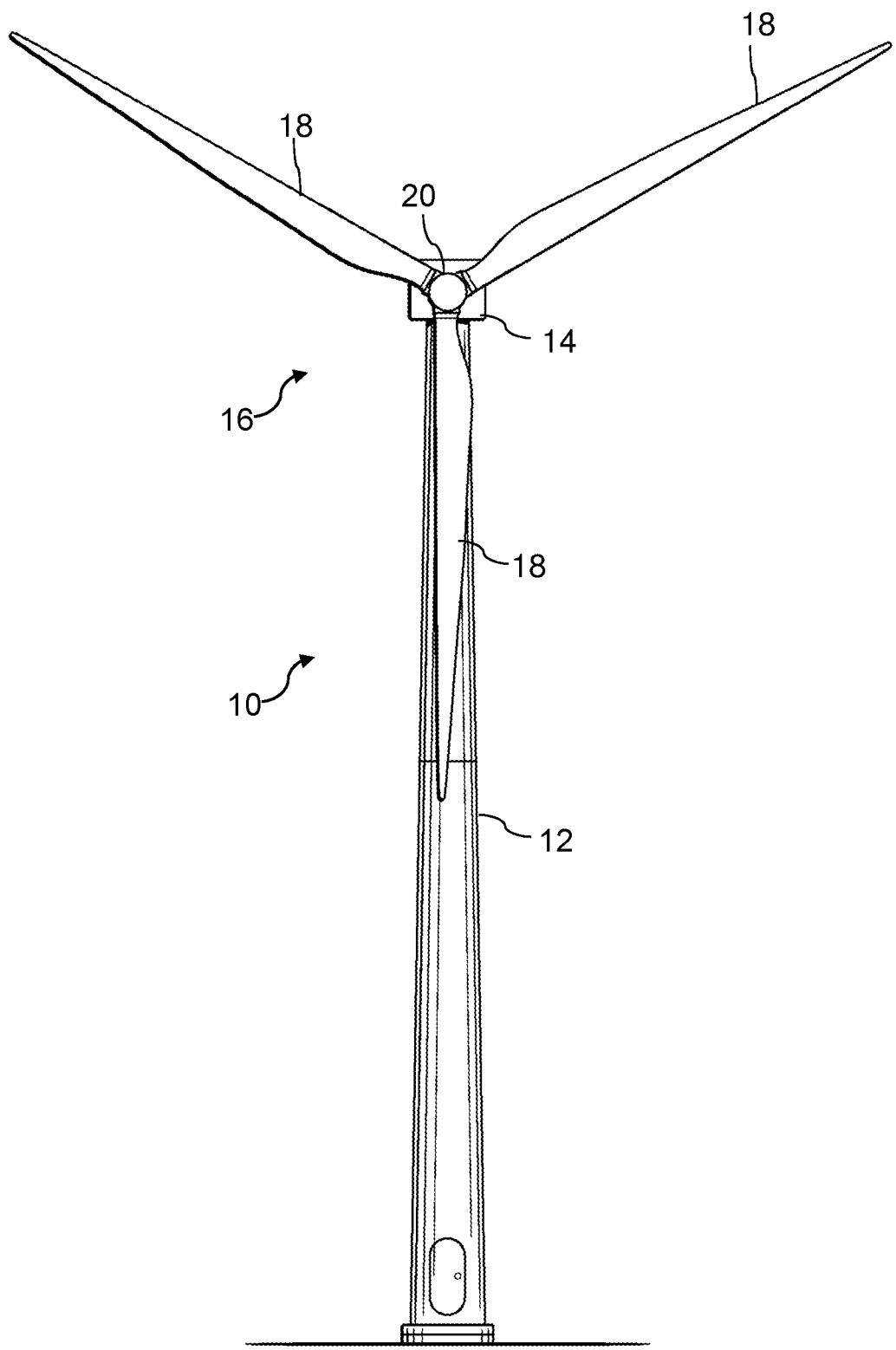
FIG. 1 is a schematic view of a wind turbine according to an embodiment of the present invention.

FIG. 1 shows a wind turbine 10 comprising a tower 12 supporting a nacelle 14 to which a rotor 16 is mounted. The rotor 16 comprises a plurality of wind turbine blades 18, wherein each of the plurality of wind turbine blades extends radially from a central hub 20. In this example, the rotor 16 comprises three blades 18, although other configurations are possible.

Figure 2:
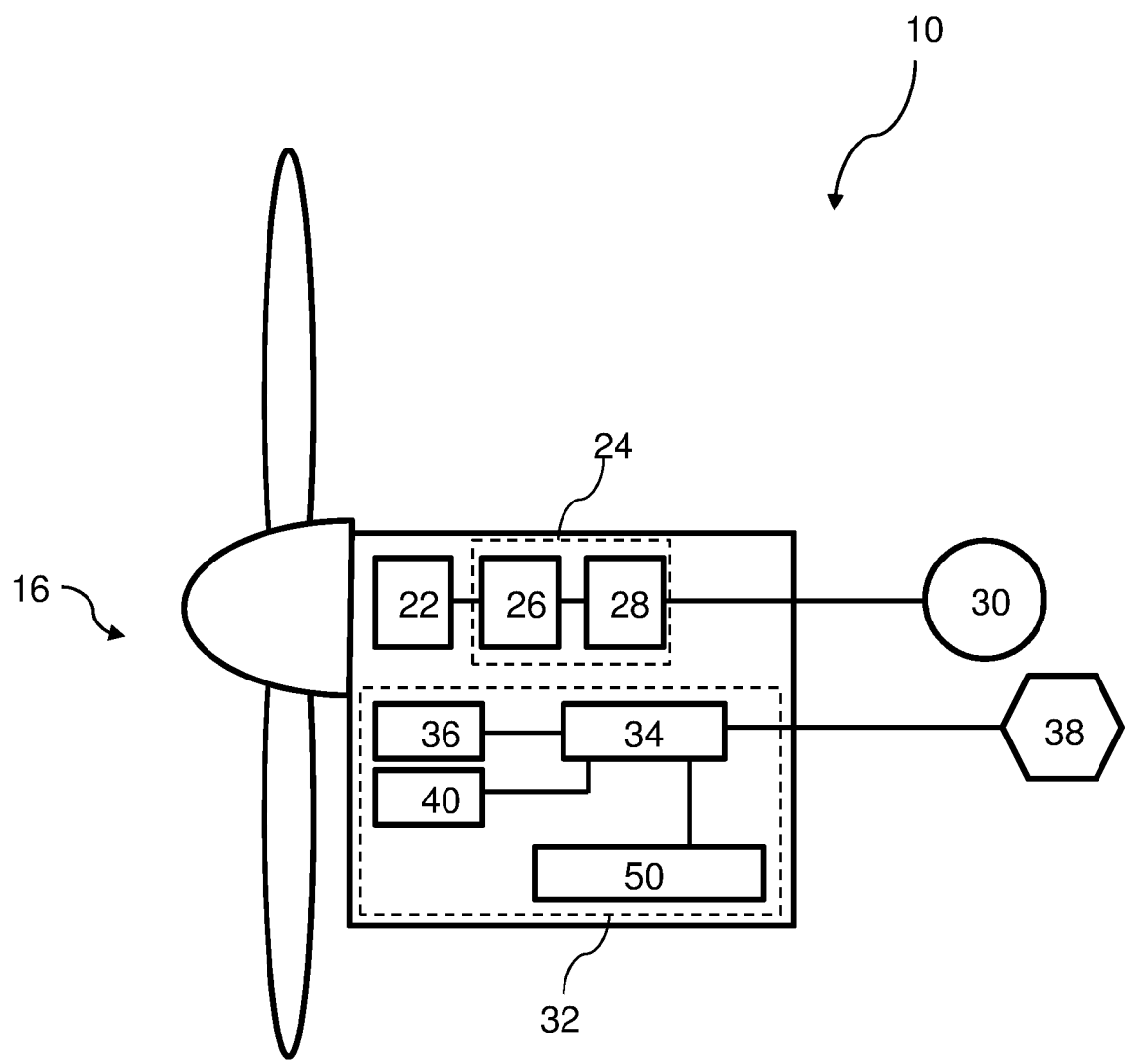
FIG. 2 is a schematic systems view of the wind turbine in FIG. 1.

With reference also to FIG. 2, which illustrates the wind turbine 10 at a systems level, the wind turbine 10 further comprises a gearbox 22 and a power generation system 24 including a generator 26 and a power converter system 28. As is known, the gearbox 22 gears up the rotational speed of the rotor 16 and drives the generator 26 which, in turn, feeds generated power to a converter system 28. Usually such a system will be based on three-phase electrical power, although this is not essential. Others wind turbine designs are known, such as 'gearless' types, also known as 'direct drive', as well as 'belt drive' transmission types.

The precise configuration of the generator 26 and converter system 28 is not central to the invention and will not be described in detail. However, for present purposes these components can be considered to be conventional and, in one embodiment, may be based on a full-scale converter (FSC) architecture or a doubly-fed induction generator (DFIG) architecture, although other architectures would be known to the skilled person.

In the illustrated embodiment, the power output of the converter system 28 of the wind turbine 10 is transmitted to a load, which is shown here as the electrical grid 30. The skilled person would be aware that different power conversion and transmission options exist, and it would be within the abilities of the skilled person to specify a suitable system. Thus, this aspect is not described in more detail here.

The wind turbine 10 further comprises a control means 32 that is operable to monitor the operation of the wind turbine 10 and to issue commands thereto to achieve a set of control objectives. The control means 32 is shown in FIG. 2, as a simplified, schematic overview of a plurality of control units and modules, and also in FIG. 3, as a more detailed example of how specific units and modules may be arranged in order to facilitate data exchange between them.

The control means 32 comprises a processor 34 configured to execute instructions that are stored in and read from a memory module 36 and/or an external data store that forms part of an external network 38. Measurement data may also be stored in the memory module 36, and recalled in order to execute processes according to the instructions being carried out by the processor 34.

The memory module 36 is specific to the processor 34 and data/instructions can be both read from and written to the memory module by the processor 34. For example, the processor 34 may store a calculated parameter as part of a process, before reading it from the memory module 36 later as part of the same or another process. Additionally, thresholds for shut down conditions and calibration data are also stored within the memory module 36.

Instructions and data may also be received from external controllers or sensors that form part of the external network 38, and recorded data and/or alerts may be issued over the external network 38 to be stored/displayed at an external source for analysis and remote monitoring.

Figure 3:
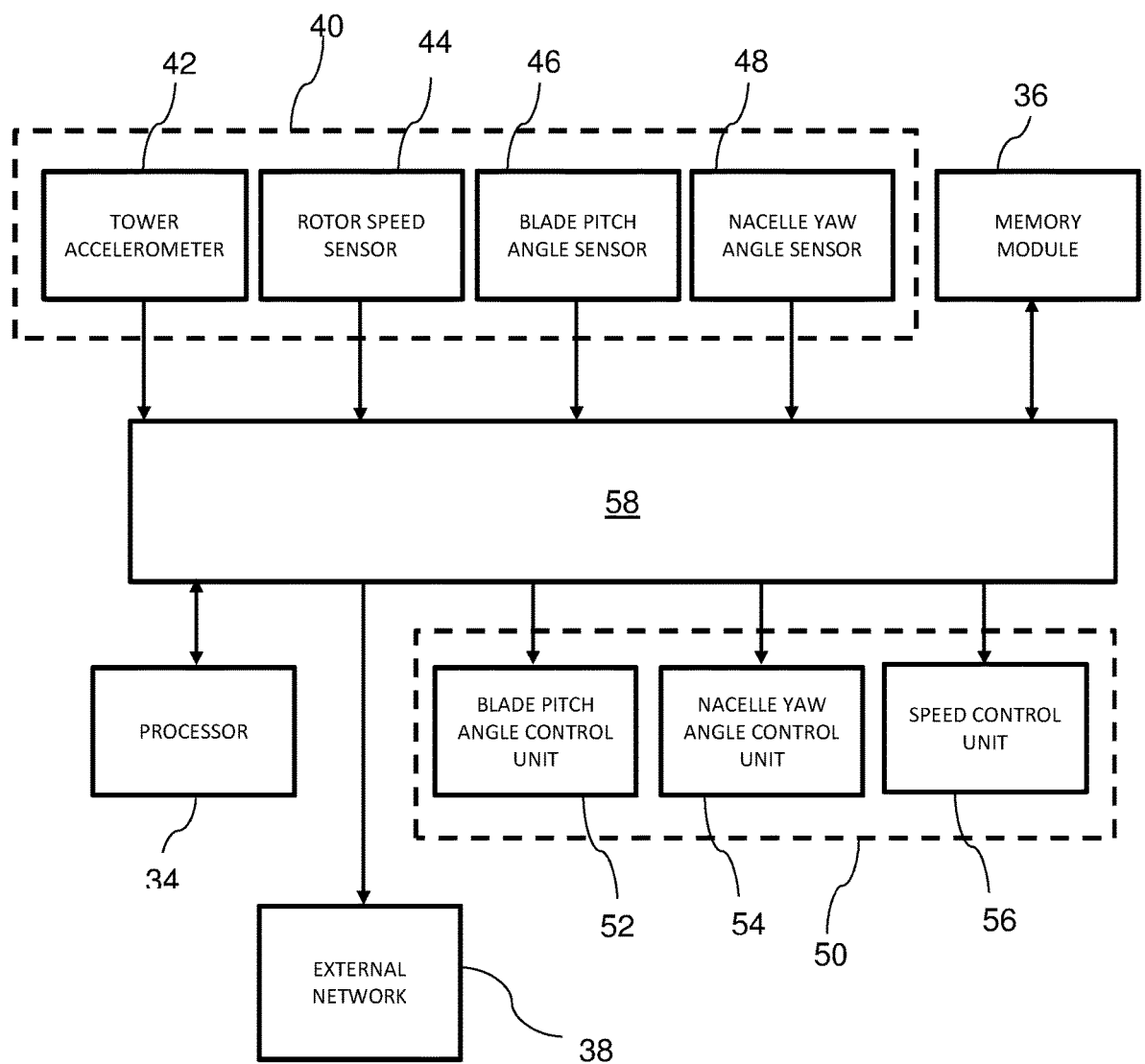
FIG. 3 is a detailed schematic systems view of a monitoring and control system of the wind turbine system in FIG. 2.

In addition, the processor 34 is in communication with a plurality of sensors 40 that are disposed within the wind turbine 10. For example, as shown in FIG. 3, the plurality of sensors 40 may comprise a tower accelerometer 42, a rotor speed sensor 44, a blade pitch angle sensor 46, and a nacelle yaw angle sensor 48.

The control means 32 of the wind turbine 10 also includes at least one control unit 50. In the configuration shown in FIG. 3, three control units 50 are included. These are a blade pitch angle control unit 52 for altering the blade pitch angle of the rotor blades 18, a nacelle yaw angle control unit 54 for altering the yaw angle of the nacelle 14, and a speed control unit 56 that is used to alter the rotor speed of the wind turbine 10 using a brake, for example, although this may also usually be achieved through converter control and pitch control.

It will be noted that FIG. 2 is a schematic view, so the way in which commands are transferred to the modules is not shown explicitly. However, it will be appreciated that suitable cabling may be provided to interconnect the units. The interconnections may be direct or 'point to point' connections, or may be part of a local area network (LAN) operated under a suitable protocol (CAN-bus or Ethernet for example), and one example of this is shown in FIG. 3. In this representation, a CAN-bus 58 forms a central connection between each of the modules (according to a suitable protocol), allowing the relevant commands and data to be exchanged between each of the modules accordingly.

It should be appreciated that rather than using cabling, the control commands may be also transmitted wirelessly over a suitable wireless network, for example operating under WiFi™ or ZigBee™ standards (IEEE802.11 and 802.15.4 respectively).

In monitoring the operation of the wind turbine 10, instructions in the form of code stored in the memory module 36 are requested by the processor 34 and transferred from the memory module 36 to the processor 34 by the CAN-bus 58. The processor 34 executes an operational method according to the instructions, using data from the sensors 40, the memory module 36 and/or the external network 38 exchanged via the CAN-bus 58. In turn, the processor 34 issues commands to the relevant control unit(s) 50 to alter the configuration of the wind turbine 10 according to the method being executed. The commands are subsequently implemented by the control unit(s) 50.

It should be appreciated that a wind turbine 10 would include more control units 50, and FIG. 3 is provided only to illustrate an example of a system architecture in which the invention may be implemented.

A principal function of the control means 32 is to control power generation of the wind turbine 10 so that it optimises power production under current wind conditions and in accordance with demanded power generation by a transmission grid operator. However, in addition to its main power control tasks, the control means 32 may be operable to perform a suite of safety and diagnostic monitoring functions and solutions. In the embodiments of the invention, one of these functions is to identify the presence of unacceptable blade "edgewise" vibrations by monitoring forces on the wind turbine 10, and to control the wind turbine 10 accordingly. The identification of blade edgewise vibrations is important, as it may aid in preventing damage to the wind turbine 10 due to unwanted oscillation of the rotor 16 during operation. Additionally, monitoring must be undertaken to ensure that dangerous levels of vibration are not reached, and to assess conditions in which unacceptable blade edgewise vibrations are most often brought about.

Figure 4:
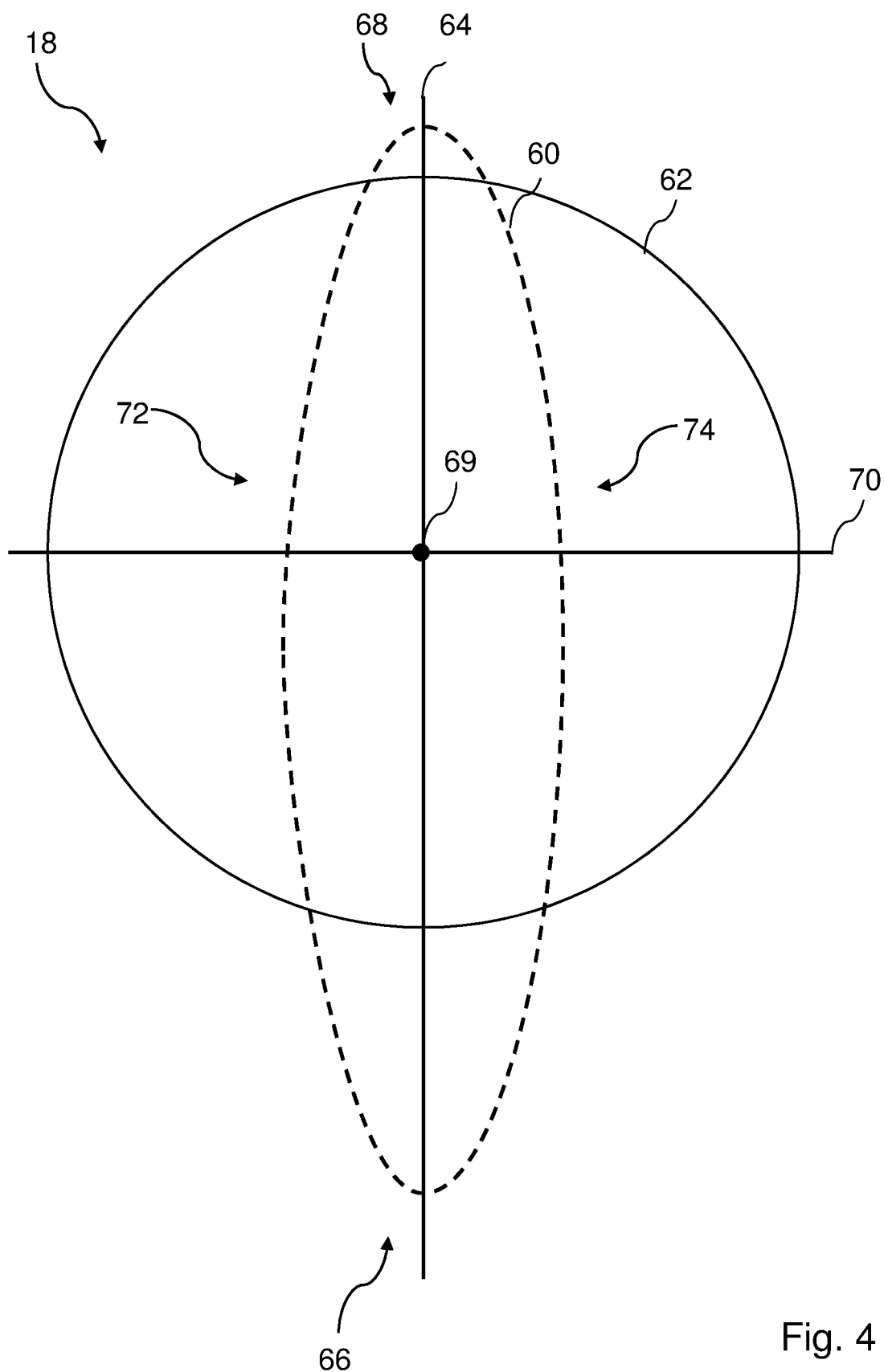
FIG. 4 is a diagram illustrating a cross section of a wind turbine rotor blade.

Edgewise vibrations of rotor blades occur along the length of the blade in the edgewise direction, which is one of two main directions in which the blade principally vibrates and oscillates. The other main direction of oscillation is in a "flapwise" direction. Referring to FIG. 4, when considering a rotor blade 18 having an outboard blade section 60, indicated by dotted lines, and a circular blade root 62, having a circumference, oscillations in the edgewise direction cause the blade 18 to move relative to an edgewise axis 64 which extends generally through the leading and trailing edges 66, 68 of the blade 18. The edgewise axis 64 is therefore substantially perpendicular to the longitudinal axis 69 of the blade 18. Similarly, oscillations in the flapwise direction cause the blade to move relative to a flapwise axis 70 which extends through the upper and lower surfaces 72, 74 of the blade and is substantially perpendicular to both the longitudinal axis 69 and the edgewise axis 64 of the blade 18.

Excitement of a blade due to air flow around it can cause the blade to oscillate in both flapwise and edgewise directions. Flapwise oscillation is often easily monitored and damped, whereas management of edgewise oscillation is more difficult. This is because the aerodynamic surface area along the upper and lower surfaces 72, 74 tends to damp oscillations in the flapwise direction, whereas there is less self-damping of the blade in the edgewise direction. Furthermore, direct action cannot easily be taken to reduce edgewise vibration in the same way that can be implemented when unacceptable flapwise vibration is measured.

When the rotor 16 is turning, oscillations of the blades 18 relative to their edgewise axes can cause movement of the blade 18 in the same plane as the plane of rotation of the rotor 16. It will be appreciated that the rotor shaft effectively is mounted at one of its ends and is unsupported at the hub end, where the blades are attached. Since edgewise oscillation of the blades excites the rotor with a force that is transverse to its longitudinal axis, in resonant conditions this may result in the rotational axis of the rotor shaft describing an erratic pattern of motion. This phenomenon is known as 'whirling'.

The seemingly complex pattern of motion of the rotor is the result of two circularly rotating force vectors that are generated by the combined oscillatory behaviour of the blades. A first force vector rotates in the same rotational direction as the rotor but at a higher frequency (progressive force vector) and a second force vector that rotates in a direction opposite to that of the rotor and at a lower frequency (regressive force vector). The result of the counter-rotating progressive and regressive force vectors is a force vector that traces an elliptical path, when viewed in a rotating reference frame aligned with the rotor.

The phase difference between the edgewise oscillations of the blades determines whether whirling occurs in the same direction as the rotor rotation, which is generally known as forward whirl or 'forward whirling mode', or whether whirling occurs in a direction opposite to that of the rotor rotation, which is generally known as backwards whirl or 'backwards whirling mode'.

As will be appreciated, whirling of the rotor shaft imparts lateral forces to the nacelle via the rotor and therefore causes it to sway from side to side. This motion is detectable by monitoring the behaviour of the nacelle or upper portion of the tower, and motion above a certain level can be considered to be indicative of the blades oscillating unacceptably in the edgewise direction. It is this movement that the inventors have appreciated can be used to identify and quantify the blade edgewise vibrations and to take mitigating action.

Figure 5:
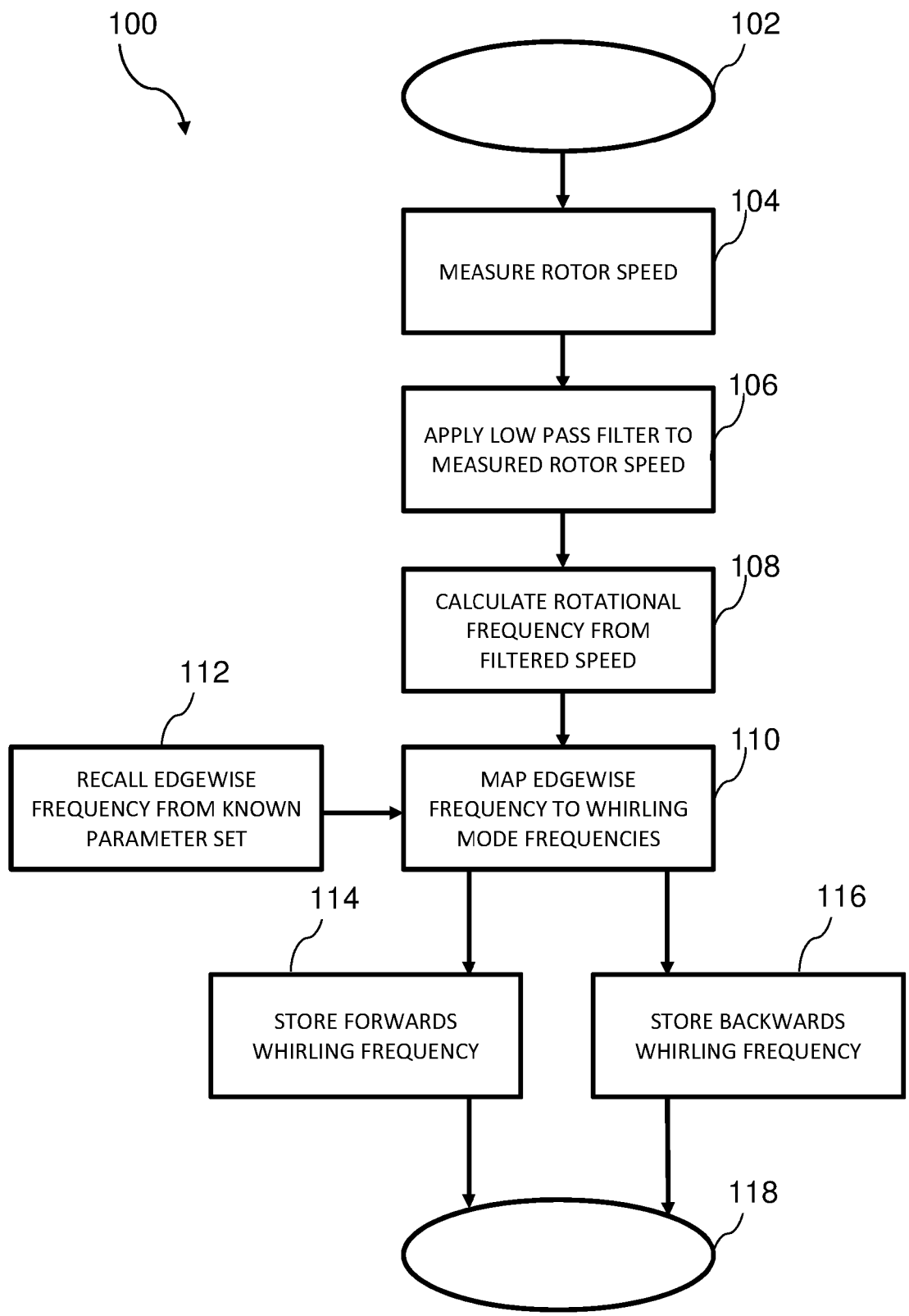
FIG. 5 is a flow chart that illustrates a process governing the identification of unacceptable blade edgewise vibrations of the wind turbine of FIG. 1.
Figure 6:
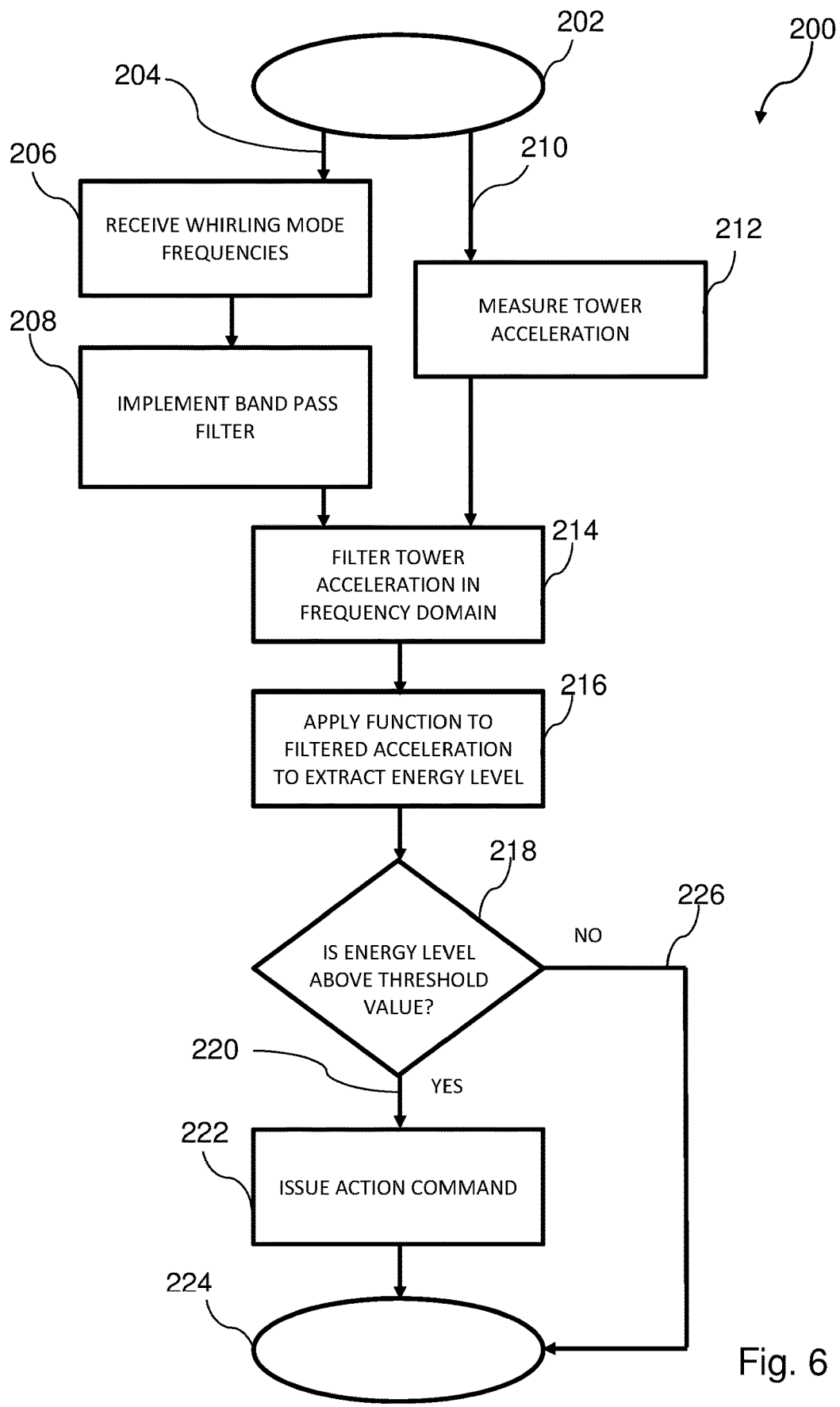
FIG. 6 is a flow chart that illustrates a process governing the determination of whirling mode frequencies of the wind turbine of FIG. 1.

FIGS. 5 and 6 are flow diagrams of processes according to embodiments of the invention. FIG. 5 is a flowchart of a process 100 by which forward and backward whirling modes may be calculated. FIG. 6 is a flowchart of a process 200 for controlling a wind turbine 10, based on identification of unacceptable edgewise vibrations at the whirling mode frequencies. The processes may be implemented using the system architectures outlined in FIGS. 2 and 3.

This process 100 of FIG. 5 initiates at step 102, and at the second step 104, the rotor speed is measured by the rotor speed sensor. A time series of the rotor speed measured over a predetermined measurement period by the sensor is created and at the next step of the process 106, a low pass filter is applied to the rotor speed time series measurement. By applying a low pass filter, an average rotor speed signal is obtained.

From the average rotor speed, a rotational frequency is calculated 108. The process moves to the next step 110, where, by using a predetermined edgewise frequency value 112 and the rotational frequency 108, the whirling mode frequencies can be mapped 110. The edgewise frequency 112 is the frequency at which the rotor blades 18 vibrate in the edgewise direction, and is a known parameter of the rotor blades 18 that is stored and recalled from an internal memory module 36. The edgewise frequency value 112 may be calculated using a number of techniques, for example it may be calculated based on structural models of the specific blade type used on the wind turbine or it may be determined by way of subjecting that specific blade type to a testing procedure designed to identify the natural edgewise frequency (eigenfrequency) of the blade.

In one embodiment, the mapping 110 of the edgewise frequency to first and second whirling mode frequencies is envisaged to be a subtraction and addition of the two component frequencies, i.e. the first whirling mode frequency is calculated by subtracting the rotational frequency 108 from the edgewise frequency 112, and the second whirling mode frequency is calculated by the addition of the rotational frequency and the edgewise frequency.

Following the mapping step 110, a first and second whirling mode frequency are obtained, which correspond to a forward whirling mode and a backward whirling mode. These whirling mode frequencies are then stored 114, 116 in the memory module 36 for subsequent use, before the process terminates at step 118. It is envisaged that the process repeats continually so as to re-calculate the whirling mode frequencies to ensure they are accurate.

Once the whirling mode frequencies have been calculated, a further process 200, as illustrated in FIG. 6, uses the determined whirling mode frequencies to identify edgewise blade oscillations, as will now be described. In the event that unacceptable blade edgewise vibrations are present during the operation of the wind turbine 10 and identified by the process 200 in FIG. 6, action may be taken to reduce the vibrations and/or generate details of the event for future analysis or reference.

With reference to FIG. 6, the process 200 may be carried out within the control means 32 of the turbine 10, by the processor 34 which issues control commands to control units 50, although it should be appreciated that the process 200 could in principle be implemented in any suitable electronic control unit of the wind turbine.

The process 200 initiates at step 202, which may be when the wind turbine 10 has been started but prior to reaching a power generating state. Therefore, the process 200 may provide a level of safety to verify that the acceptable conditions are present before running the wind turbine 10 up to an operational speed.

Initially, the process 200 proceeds along two branches simultaneously. At a first branch 204, a whirling mode frequency is received 206. The whirling mode frequency is calculated according to the process 100 shown in FIG. 5, and recalled from the memory module 36 by the processor 34. In another embodiment of the invention, the whirling mode frequency may be a parameter stored within the memory module that has been calculated or predetermined in some other way, for example determined during the design of the blade and modelling of the rotor system.

Due to a forward and a backward whirling mode frequency being calculated by the process 100 in FIG. 5, and the whirling mode frequencies having the potential to differ substantially, both whirling mode frequencies may be considered by implementing two of processes 200 simultaneously. However, for ease of understanding the following discussion will be based on analysing data relating to a single whirling mode frequency.

Having received the whirling mode frequency, the processor 34 implements, at step 208, a band-pass filter having a centre frequency set as equal to the whirling mode frequency. A bandwidth for the filter may be a set bandwidth for each whirling mode frequency, or it may vary according to the frequency and/or speed of the rotor. It is envisaged, however, that the bandwidth of the filter would be in the range 0.1 Hz to 0.5 Hz, although it is possible that smaller or greater bandwidths could be used depending on the intended outcome.

In a second initial branch 210 of the process 200, at step 212, a component of tower acceleration in a direction parallel to the rotor plane is measured i.e. transverse to a longitudinal axis of the nacelle. The tower acceleration is measured 212 using the accelerometer 42 mounted either within the nacelle 14 or the tower 12. It is envisaged that the higher the position of the accelerometer in the tower, the better the nacelle oscillations will be measured, so it is currently preferred that an accelerometer should be located towards the tower top or in the nacelle. The processor 34 receives an acceleration measurement time series over a respective period of time. The period over which measurements are made may vary according to the speed of the rotor 16 or may be set at a single value. Measurements are made continuously by the accelerometer using a series of overlapping sampling windows, also referred to as a 'rolling average'. A typical window length would be between 1 and 5 seconds, with a sampling frequency of at least 10 Hz. Other measurement techniques may be used such as an exponential averaging technique.

The tower acceleration signal is then filtered, at step 214, using the band-pass filter. Some operational vibration and other frequency content is filtered out by the band-pass filter, leaving a signal that is substantially composed of vibration in the region of the whirling mode frequency that is caused by the edgewise vibrations of the blades 18. In this way, the process determines, obtains, or calculates a frequency spectrum in the time domain of the measured tower acceleration in the proximity of the determined whirling mode frequency. In effect, this process narrows the scope of the measured acceleration to consider only the region of the whirling mode frequency.

At step 216, a function is applied to the filtered acceleration to obtain a value from the acceleration that is representative of the energy content of the signal. The function is applied to both remove noise in the signal and to allow the signal to subsequently be compared to a predetermined threshold by quantifying the energy content of the signal at the frequencies surrounding the whirling mode frequencies. The function could, for example, be implemented as a recursively applied root-mean-square operation, or as a similar process involving a low pass filter. Other options for analysing the energy content are possible. For example, the peak value of the acceleration signal could be evaluated by monitoring the maximum amplitude of the acceleration in the frequency range of interest over a predefined time period. A further alternative would be to convert the filtered acceleration signal to the frequency domain by an appropriate frequency transform (i.e. a Fast Fourier Transform (FFT) algorithm) and then evaluate the peak power at a given frequency or to evaluate the total energy content of the predetermined range of frequencies, being the area under the FFT curve.

The processed acceleration signal is then compared, at step 218 to a predetermined threshold. In this embodiment of the invention, the threshold may be a single, predetermined value. However, in other embodiments, the threshold may depend upon the rotor speed or the blade pitch angle.

If the energy content of the filtered signal exceeds 220 the threshold, at least one action command is issued, at step 222.

In an alternative embodiment, the processor 34 only issues the action command(s) in response to an exceedance of the threshold for at least a predetermined period of time, which may help false positive determinations. Alternatively, certain commands may be issued based upon the duration of the exceedance of the threshold. This ensures that anomalous vibrations and/or transients do not inadvertently impact the operation of the wind turbine.

When an action command has been issued successfully, the process 200 is progressed to step 224, where the process 200 terminates, to be repeated at the next cycle. If no exceedance of the threshold is identified 226, the process 200 terminates at step 224 without issuing an action command.

It is envisaged that in one embodiment, the action command comprises the processor 34 generating a record of the identified exceedance, containing information about the level of the exceedance, the time at which the threshold was exceeded, and the duration for which the threshold was exceeded.

In an alternative embodiment, an action command may be issued to the control units 50 to alter the configuration of the wind turbine 10 so as to derate the wind turbine which should have the effect of reducing the excitation of the blades, or even to implement a complete shutdown if it is determined that the rotor must be brought to a complete stop in order to halt blade oscillations. The command may be specifically targeted to control the or each rotor blade to move to a predetermined blade pitch angle that is different to a blade pitch angle at which the acceleration measurement was made. In alternative embodiments the command may operate an actuator to change the profile of the blade using at least one flap attached to the blade. Other techniques may be used to change the rotational speed of the rotor, thereby changing the whirling mode frequencies.

In another embodiment, the action command may comprise storing the raw data of the time series of the exceedance in the memory module 36 of the turbine 10, or sending the raw data to an external memory module 36 for further analysis by an external module or supervisor.

Furthermore, it may be advantageous to combine the abovementioned action commands. A number of other command functions known to the skilled person may also be implemented using the architecture described in response to an exceedance of the threshold value. For example, it may also be desirable to compare each measurement against multiple thresholds, issuing different commands and output actions depending on which thresholds are exceeded. In this case, the process illustrated by the flow chart in FIG. 5 would have extra steps to compare the measured values with each threshold separately and either alter the operation of the wind turbine according to the instructions set out for the highest threshold exceeded, or issue all commands and actions associated with each threshold exceeded.

For example, a vibration signal may be compared against three thresholds, whereby the lowest threshold is associated with a log of the event being generated and stored in the memory module, the middle threshold is associated with an alert notification being sent to an external supervisor, and the highest threshold triggers the execution of a shut-down procedure for the wind turbine. The process of FIG. 6 may be altered such that exceedance of one threshold prompts the processor to implement only the action associated with that threshold, or to implement the action associated with the exceeded threshold and the actions associated with all thresholds that are below the exceeded threshold.

It will be appreciated by those skilled in the art that the invention has been described by way of example only, and that a variety of alternative approaches may be adopted without departing from the scope of the invention, as defined by the appended claims.

The invention claimed is:

1. A method of controlling a wind turbine comprising a rotor having at least one rotor blade, and at least one accelerometer housed within a nacelle or a tower of the wind turbine, wherein the method comprises:
    determining a whirling mode frequency for the wind turbine in dependence on a measured rotor frequency and a predetermined natural edgewise vibration frequency of the rotor blade;
    measuring an acceleration signal indicative of movement of the nacelle of the wind turbine;
    determining a frequency spectrum of the measured acceleration signal in the proximity of the determined whirling mode frequency;
    determining a characteristic value that is representative of the energy content of the determined frequency spectrum; and
    performing at least one control action to alter the configuration of the wind turbine to derate the wind turbine if the characteristic value exceeds a predetermined threshold.

2. The method of claim 1, wherein the determined whirling mode frequency is one or more of a forward whirling mode and a backward whirling mode.

3. The method of claim 1, wherein determining the frequency spectrum comprises filtering the measured acceleration signal using a band-pass filter having a center frequency that is equal to the determined whirling mode frequency.

4. The method of claim 1, wherein the characteristic value is an instantaneous peak value.

5. The method of claim 1, wherein the characteristic value is related to the Root Mean Square (RMS) of the frequency spectrum.

6. The method of claim 1, further comprising performing at least one of the following if the characteristic value exceeds the predetermined threshold:
    generating a record, including the characteristic value, the duration of the exceedance of the threshold, and the time at which the exceedance occurred;
    storing raw data of the exceedance for later analysis; and
    issuing an alert to an external reporting system.

7. The method of claim 1, wherein the control action comprises causing a blade pitch angle of the or each rotor blade to be moved to a predetermined blade pitch angle that is different to a blade pitch angle at which the acceleration measurement was made.

8. The method of claim 1, wherein the control action comprises changing a rotational speed of the rotor such that the whirling mode frequency is altered.

9. The method of claim 1, wherein the predetermined threshold is a first predetermined threshold, and if the characteristic value exceeds a second predetermined threshold higher than the first predetermined threshold, implementing a shut-down process of the wind turbine.

10. A controller for a wind turbine control system comprising at least one accelerometer housed within a nacelle or a tower of the wind turbine and at least one rotor blade, wherein the controller comprises a processor, a memory module, and an input/output system, and wherein the memory includes a set of program code instructions which when executed by the processor, implement a method according to claim 1.

11. A wind turbine comprising the controller of claim 10.

12. A computer program product comprising a non-transitory machine readable medium storing program code instructions for implementing a method in accordance with claim 1.

13. A method of controlling a wind turbine comprising a rotor having at least one rotor blade, and at least one accelerometer housed within a nacelle or a tower of the wind turbine, wherein the method comprises:

determining a whirling mode frequency for the wind turbine;
  measuring an acceleration signal indicative of movement of the nacelle of the wind turbine;
  determining a frequency spectrum of the measured acceleration signal in the proximity of the determined whirling mode frequency by filtering the measured acceleration signal using a band-pass filter that has a center frequency equal to the determined whirling mode frequency and that has a bandwidth of between 0.1 Hz and 0.5 Hz;
  determining a characteristic value that is representative of the energy content of the determined frequency spectrum; and
  performing at least one control action to alter the configuration of the wind turbine to derate the wind turbine if the characteristic value exceeds a predetermined threshold.

14. A method of controlling a wind turbine comprising a rotor having at least one rotor blade, and at least one accelerometer housed within a nacelle or a tower of the wind turbine, wherein the method comprises:

determining a whirling mode frequency for the wind turbine;
  measuring an acceleration signal indicative of movement of the nacelle of the wind turbine;
  determining a frequency spectrum of the measured acceleration signal in the proximity of the determined whirling mode frequency;
  determining a characteristic value that is representative of the energy content of the determined frequency spectrum; and
  performing at least one control action to alter the configuration of the wind turbine to derate the wind turbine if the characteristic value exceeds a predetermined threshold,
  wherein the predetermined threshold is determined as a function of blade pitch angle.

\* \* \* \* \*